B. G. FITZHUGH.
Curtain-Roller Holders.
No. 138,014.  Patented April 22, 1873.
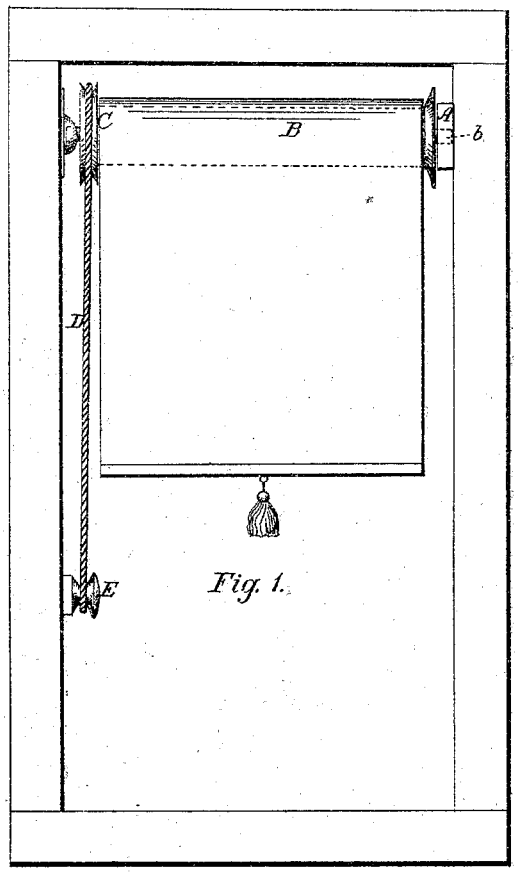
Fig. 1.
Fig. 3.
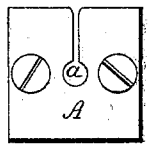
Fig. 2.
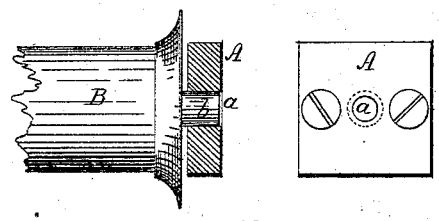
Witnesses:
Aug. H. Girard.
J. West Wagner.
Inventor:
Benjamin G. Fitzhugh
By Johnson, Klaucke & Co.
his Attorneys

UNITED STATES PATENT OFFICE.

BENJAMIN G. FITZHUGH, OF FREDERICK, ASSIGNOR TO MATHIAS MARTIN, OF BALTIMORE, MARYLAND.

IMPROVEMENT IN CURTAIN-ROLLER HOLDERS.

Specification forming part of Letters Patent No. 138,014, dated April 22, 1873; application filed October 7, 1872.

*To all whom it may concern:*

Be it known that I, BENJAMIN G. FITZHUGH, of the city and county of Frederick, in the State of Maryland, have invented certain new and useful Improvements in Curtain-Roller Holders, of which the following is a specification:

My invention relates to devices for holding the rollers of window-curtains, to maintain the latter at the desired position; and the invention which forms the subject-matter of this patent consists in mounting the axis-pins, one or both, of the roller in rubber brackets, and obtaining by such bearing a grasping hold or bite of the rubber upon the axis pin or pins, the object whereof is to obtain both a bracket-bearing and a clamping-socket by one and the same piece of rubber, which will bind around the bearing of the roller sufficient to hold the curtain at any point, with the advantages of dispensing with the usual metallic brackets, expensive cord-tighteners, and producing an exceedingly cheap, simple, and durable roller-holding bracket, easily and quickly applied.

In the accompanying drawing, Figure 1 represents a window-frame with my improvement applied thereto. Fig. 2 represents the rubber holding-bracket in elevation and section; and Fig. 3, an open rubber bracket.

The brackets for the bearing-pins of the roller are rubber pieces A, of suitable size and secured to the window-frame by tacks, screws, or otherwise. They are provided with holes $a$ for the metal bearing-pins $b$ of the roller B; but the holes $a$ must be much smaller than the diameter of the roller-pins $b$, as shown in Fig. 2, in which the dotted line is the pin $b$, so that the latter, when forced into the holes $a$, will force and crowd the rubber and cause it to lay hold of the bearing-pin $b$ or pins, and bind around with the force of the displaced or crowded rubber, and thus serve as a yielding clamp upon the bearing to hold the roller, with the weight of the curtain, at any point desired. The roller is fitted with the usual cord-pulley C, and the operating-cord D only requires to be passed over a button, E, as the holding of the curtain and roller does not depend upon the tautness of the cord, but upon the griping rubber bearing of the roller.

Both the roller journal-pins for large curtains may be fitted with rubber bearing-brackets, in which case one of them must be slitted or open, as shown in Fig. 3, to allow the roller-pin to be inserted and withdrawn when necessary. A single bearing-bracket, however, will answer for a small curtain, in which case the other bracket may be open and of metal.

Having described my invention, I claim—

The combination, with a curtain-roller, of a rubber-bracket binding-bearing, to hold the curtain, as described.

In testimony whereof I have hereunto set my hand this 24th day of September, A. D. 1872.

BENJAMIN G. FITZHUGH.

Witnesses:
A. E. H. JOHNSON,
J. W. HAMILTON JOHNSON.